(12) United States Patent
Carter et al.

(10) Patent No.: US 8,527,810 B1
(45) Date of Patent: *Sep. 3, 2013

(54) PROVIDING SYSTEM RESET INFORMATION TO SERVICE PROVIDER

(75) Inventors: Wade Carter, Snellville, GA (US); Robert Allen Walston, Sandy Springs, GA (US); Robert Wynn, Pendergrass, GA (US)

(73) Assignee: Arris Enterprises, Inc., Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/407,383

(22) Filed: Feb. 28, 2012

Related U.S. Application Data

(63) Continuation of application No. 12/396,356, filed on Mar. 2, 2009, now Pat. No. 8,127,179.

(60) Provisional application No. 61/032,698, filed on Feb. 29, 2008.

(51) Int. Cl.
*G06F 11/00* (2006.01)

(52) U.S. Cl.
USPC .......................................................... 714/23

(58) Field of Classification Search
USPC .......................................................... 714/23
See application file for complete search history.

*Primary Examiner* — Bryce Bonzo
(74) *Attorney, Agent, or Firm* — Troy A. Van Aacken

(57) ABSTRACT

Methods for collection of device reset history from a network communication device comprising: (a) determining whether a reset condition is triggered by software or hardware, (b) for a software triggered reset: (i) upon a software exception, retrieving related reset information, (ii) upon an operator initiation, retrieving related reset information, (iii) allocating space in non-volatile memory, (iv) storing retrieved current reset information together with a corresponding reset time, and (v) adding the current reset information to historical reset information, (c) proceeding with the reset, (d) executing startup code during reboot, (e) upon a hardware triggered reset; (i) retrieving hardware registry and other residual hardware information still present, (ii) allocating space in non-volatile memory, (iii) storing the current retrieved reset information together with a current time that corresponds approximately to the reset and (iv) adding the reset information to historical reset information, and (f) continuing with normal operation of the device.

18 Claims, 2 Drawing Sheets

PROVIDING SYSTEM RESET INFORMATION TO SERVICE PROVIDER

RELATED APPLICATIONS

This application is a continuation claiming priority to U.S. patent application Ser. No. 12/396,356, entitled "Providing System Reset Information to Service Provider," filed on Mar. 2, 2009, and issuing on Feb. 28, 2012 as U.S. Pat. No. 8,127,179, which is a non-provisional claiming priority to U.S. Provisional Application Ser. No. 61/032,698, entitled "Method for Providing System Reset Information to a Service Provider," filed on Feb. 29, 2008, the disclosures of which are hereby incorporated by reference in their entirety.

TECHNICAL HELD

The present invention relates generally to telephony modems, and more particularly to collection of device reset history from network communication devices and to preservation of that reset history.

BACKGROUND

Cable data systems are used to allow cable TV subscribers use the Hybrid-Fiber-Coax network as a communication link between their home networks and the Internet. As a result, computer information (Internet Protocol packets) can be transmitted across the Hybrid-Fiber-Coax network between home computers and the Internet. The Data Over Cable Service Interface Specification ("DOCSIS"—defined by CableLabs™—specifies the set of protocols that must be used to effect a data transfer across the Hybrid-Fiber-Coax network ("HFC"). Two fundamental pieces of equipment facilitate this data transfer: a cable modem ("CM") which is positioned in the subscriber's home, and a Cable Modem Termination System ("CMTS") which is positioned in the head end of the cable TV company.

In addition to data traffic, subscribers are more and more obtaining telephony voice services over networks other than the traditional public switched telephone network ("PSTN"), A multiple services operator ("MSO") may provide such telephony services, in addition to data over cable service via DOCSIS. For example, CableLabs has established the PacketCable™ standard for providing telephony services over cable. A subscriber typically has a device that includes a DOCSIS cable modem for transmitting and receiving data and a media terminal adaptor ("MTA"), or embedded MTA ("eMTA") for processing voice traffic for transmission and reception over cable.

To send and receive telephony/voice calls using a cable modem, a user may couple a traditional telephony device to a subscriber line interface ("SLIC") jack, typically an RJ-11 jack. The operation of the telephony device coupled in this fashion should be transparent to the user, i.e., it operates as if it were plugged into a traditional RJ-11 telephone jack coupled to the PSTN.

In addition to a standard telephony device being coupled to a cable modem/EMTA, a user device that is designed to send and receive internet protocol ("IP") packets may be used. Session Initiation Protocol ("SIP") may be used for call setup signaling. SIP is a protocol that includes logical devices for processing call set up packets, and is designed to operate peer-to-peer with other SIP-based devices. Certain SIP-based devices or logical blocks facilitate traditional PSTN service features, such as, for example, legal interception of calls, emergency calls, such as 911 in United States. Further background information relative to SIP may be found in IETF RFC 3261, entitled "SIP: Session Initiation Protocol," which may be found at www.ietf.org and is incorporated by reference herein in its entirety.

Subscriber expectations include PSTN-equivalent primary line service that includes high availability and access to E911/911 services. Availability for telephone service from the PSTN is generally specified as five-nines and equates to 99.999% uptime. Five-nines availability corresponds to a down time on the order of five minutes per year. This amounts to a requirement that a PSTN telephone is always available for making emergency calls.

Telephony modems that reset for unknown reasons are at risk of not meeting the five-nines availability requirement. Each telephony modem reset can take up to 1 minutes to recover. At this rate, it only takes a few resets to eat up the five minutes per year downtime. If telephony modems are resetting, then system operators need to know the reasons for the resets in order to make corrections, whether in the devices or in the network conditions. Thus, there is a need for a method of collecting the reset data and making it available to system operators.

SUMMARY

Briefly described, and according to one embodiment, the present invention is directed towards methods for the collection of device reset history from network communication devices and to preservation of that reset history.

It is an object of the present invention to provide a method for collection of device reset history from a network communication device comprising: (a) determining that a software reset condition has been triggered, (b) upon determination that the reset condition is due to a software exception, retrieving reset information that includes software exception information, (c) upon determination that the software reset condition is due to an operator initiation, retrieving reset information that includes software source information, (d) allocating space in a non-volatile memory of the network communication device, (e) storing current reset information into the non-volatile memory, that includes the reset information that has been retrieved together with a corresponding reset time, and (f) adding the current reset information to historical reset information within the non-volatile memory. In one embodiment, the network communication device is a telephony modem. In another embodiment, the network communication device is a cable modem.

In some embodiments of the present invention, the non-volatile memory is a flash memory, a hard drive or an optical disc. In still another embodiment, the non-volatile memory is structured as a circular buffer.

It is a further object of the present invention that specified parameters are stored within the non-volatile memory, wherein each specified parameter provides information related to status of the network communication device.

It is a further object of the present invention that the historical reset information is provided in response to an operator request.

It is a further object of the present invention that reset information is presented to a management system for analysis and tracking of reset information in determination of reset conditions and reset causes.

It is a further object of the present invention that the historical reset information be retrieved from the non-volatile memory and formatted into a data structure for subsequent retrieval by a high level management system.

It is a further object of the present invention to provide a method for collection of device reset history from a network communication device comprising: (a) determining that a hardware reset condition has occurred, (b) proceeding with the hardware reset, (c) executing startup code during reboot, (d) upon determination that the reboot was triggered by a hardware reset, retrieving reset information that includes hardware registry information and other residual hardware information that is still present after the hardware reset, (e) allocating space in a non-volatile memory, (f) storing current reset information into the non-volatile memory that includes the reset information that has been retrieved together with a current time that corresponds approximately to the hardware reset, and (g) adding the current reset information to historical reset information within the non-volatile memory.

It is a further object of the present invention to provide a method for collection of device reset history from a network communication device comprising: (a) upon determination that a reset condition has been triggered, determining whether the reset condition is triggered by software or hardware, (b) for a reset condition triggered by software: (i) upon determination that the reset condition is due to a software exception, retrieving reset information that includes software exception information, (ii) upon determination that the reset condition is due to an operator initiation, retrieving reset information that includes software source information (iii) allocating space in a non-volatile memory of the network communication device, (iv) storing current reset information into the non-volatile memory that includes the reset information that has been retrieved together with a corresponding reset time, and (v) adding the current reset information to historical reset information within the non-volatile memory, (c) proceeding with a reset of the network communication device, (d) executing startup code during reboot, (e) upon determination that the reset condition was triggered by hardware: (i) retrieving reset information that includes hardware registry information and other residual hardware information that is still present after the hardware reset, (ii) allocating space in a non-volatile memory of the network communication device, (iii) storing the current reset information into the non-volatile memory, that includes the reset information that has been retrieved together with a current time that corresponds approximately to the hardware reset and (iv) adding the current reset information to historical reset information within the non-volatile memory, and (f) continuing with normal operation of the network communication device.

It is a further object of the present invention that executing the startup code also comprises retrieving hardware state information after reset to determine whether the reset was triggered by software or hardware.

It is a further object of the present invention that the hardware state information reflects the last known state of the hardware before reset.

It is a further object of the present invention that the hardware state information includes residual effects of the reset in the hardware.

It is a further object of the present invention that the hardware state information is retrieved from hardware registers that are not reset during a hardware reset.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Reference is now made in detail to the description of the embodiments of systems and methods for collection of reset information from a network communication device and preservation of the reset history as illustrated in the accompanying drawings. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

Subscriber expectations include PSTN-equivalent primary line service that includes high availability and access to E911/911 services. Availability for telephone service from the PSTN is generally specified as five-nines and equates to 99,999% uptime. Five-nines availability corresponds to a down time on the order of five minutes per year. This amounts to a requirement that a PSTN telephone is always available for making emergency calls.

Telephony modems that reset for unknown reasons are at risk of not meeting the five-nines availability requirement. Each telephony modem reset can take up to 1½ minutes to recover. At this rate, it only takes a few resets to eat up the five minutes per year downtime. If a telephony modem is resetting, then system operators need to know the reasons for the resets in order to make corrections, whether in the devices themselves or in the network conditions. For example, if a customer resets the telephony modem several times in a short time period, there could be an indication of a problem with the modem. Information regarding the status and other settings of the device can provide useful data in analyzing and resolving the problem. The present invention provides a method of collecting the reset data and making it available to system operators.

Figure 1:
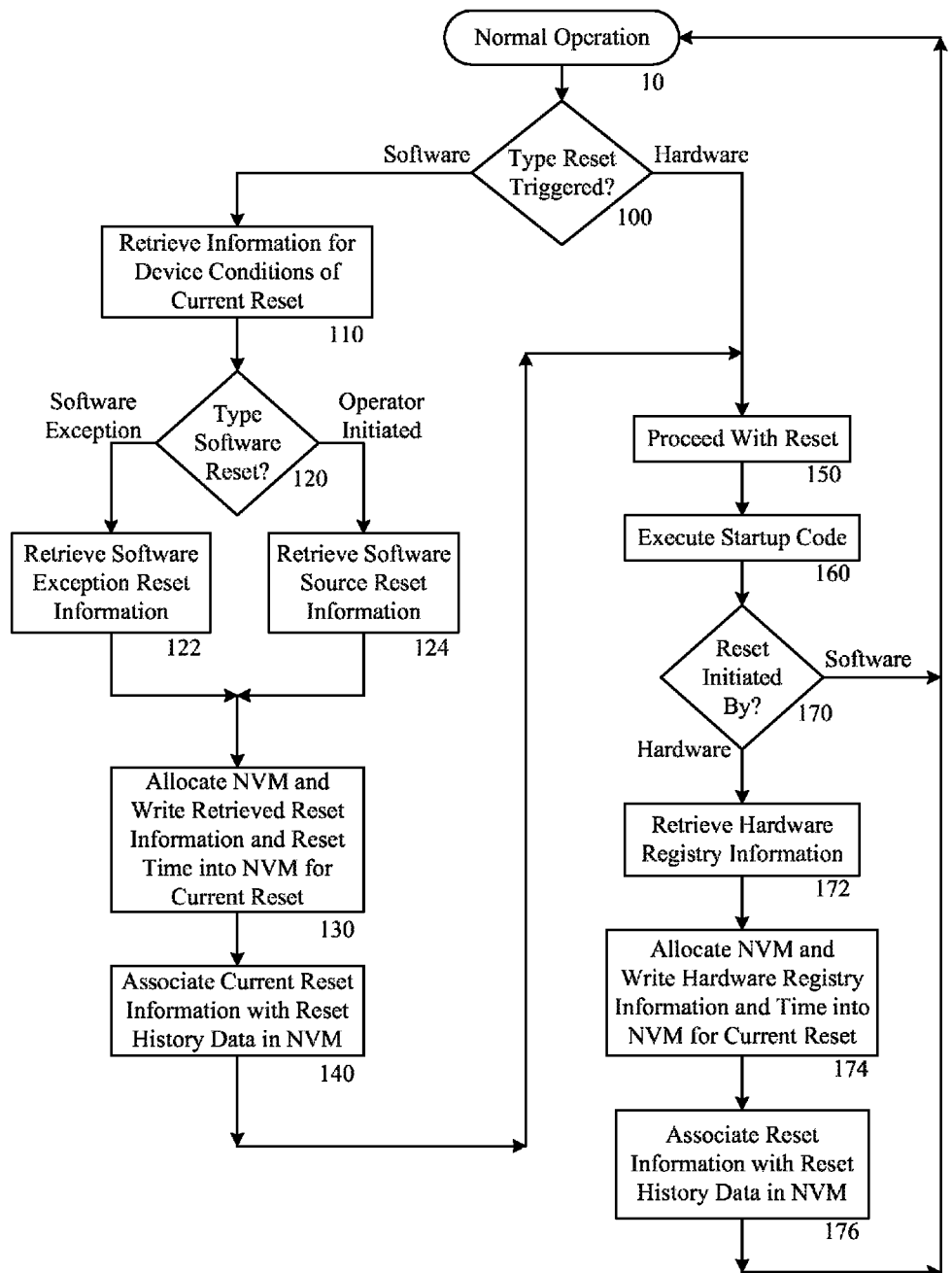
FIG. 1 is a flowchart illustrating a method for detecting a reset condition in a network communication device, determining the reset type and collecting the reset information to a non-volatile memory.

FIG. 1 is a flowchart illustrating a method for detecting a reset condition in a network communication device, determining the reset type and collecting the reset information to a non-volatile memory ("NVM").

Device reset history is collected from a network communication device such as a telephony modem. Although monitoring for resets may occur within network communication devices, such monitoring is not directly addressed in this invention. Rather, the collection of relevant information begins when a reset occurs within the network communication device during normal operations 10. Upon a determination that a reset has occurred at step 100, the retrieval of device conditions and related information for the detected reset begins at step 110 for a software initiated reset. The retrieved information includes the type of reset and can also include any specified parameters that are deemed useful in relation to device status and/or possible causes of the reset. If a hardware reset occurs, then the reset occurs immediately at step 150.

The typical types of reset that can occur are software resets and hardware resets. Software resets can be due to a software exception, e.g. divide by zero, or due to a software initiated reset from another program. Hardware resets can occur due to a power cycle such as a loss of power, a hardware failure within the device, or due to the reset button being pressed, e.g. by a customer or service technician.

Turning first to software resets, once the information related to device conditions is retrieved at step 110, the type software reset is determined at step 120. If the reset is due to a software exception, then the software exception type and other reset information is retrieved at step 122. An example of a software exception is a divide-by-zero instruction being encountered within a program, or an attempt to address an out-of-range memory location. If the software reset is initiated by an operator or by another program, then that software source and other reset information is retrieved at step 124. Installation of new program code that requires a reboot is one example of a software initiated reset.

Retrieval of reset information can also include specified parameters related to the particular network communication device, e.g. telephony modem, as well as to the status of the device. Once the reset information and any other related parameters are retrieved, space is allocated in a non-volatile memory for storing the data at step 130. The non-volatile memory is typically a flash memory type device, though other types of non-volatile memory such as memory sticks or any other medium which can be used to carry or store data structures and other computer readable information are well within the scope of this invention. Once the space is allocated, the retrieved reset information, together with the reset time and any other collected information, is written into the non-volatile memory and associated with the current reset. Storing the reset information in the non-volatile memory allows for retrieval of the reset information once the reset is complete and after the device has restarted and is operational again.

It should be understood that the reset information is collected after the reset condition occurs. Once a reset is initiated, the reset information is collected and stored in newly allocated space within a non-volatile memory for later retrieval after the reset is complete. While the reset is in process, the information is being collected and stored away for later retrieval and use.

The actual reset of the network communication device occurs at step 150 whether the reset is software or hardware initiated. For a software initiated reset, the reset occurs through the normal course of events after the device status, time and any other relevant information is stored in the non-volatile memory. For resets that are initiated due to hardware conditions, it is possible that the firmware may not be able to write to the flash memory at precisely the time of reset. However, upon reboot after such an occurrence, some hardware status information can be retrieved. Additionally, the time can be obtained, for example, from a time-of-day server, to provide an approximate time to be included with the other stored reset information.

After the reset occurs, the network communication device reboots and executes its startup code at step 160. A determination is then made whether the reset was initiated by software or hardware conditions at step 170. One method of making this determination is to store a parameter that indicates a software reset. This parameter could be stored in the non-volatile memory, for example, would be stored during the software reset, and it absence would indicate a hardware reset. It wilt be readily appreciated that there are any number of ways to preserve this information so that it can be recovered upon reboot of the network communication device.

If the reset was software initiated, then normal operations are resumed at step 10. Otherwise, the retrieval of hardware information occurs at step 172. Reset information related to the hardware is retrieved and includes hardware registry information as well as other residual hardware information that remains available after the hardware reset. Hardware information that can be retrieved after the reset includes state information that reflects the last known state of the hardware. There are typically hardware registers that are not reset as part of a hardware reset. The information in these registers can also provide insight as to the status of the device and why the reset may have occurred.

Once the hardware information is retrieved, memory is allocated in the non-volatile memory at step 174. The hardware registry information and other hardware state information are written to the non-volatile memory as part of the current reset information. Additionally, the time can be retrieved upon reboot of the device and stored along with the other hardware information. While the time at reboot is not the actual time that the reset occurred, as is available for a software reset, it is the next available time after the reset and provides a reasonable approximation for analysis purposes.

Once the hardware reset information is written to the non-volatile memory, it is associated with the current reset and becomes part of the reset history for the device. Normal device operation then resumes at step 10.

An additional feature of the current invention is the capability to retrieve information related to multiple resets. The non-volatile memory, typically flash memory, is organized in a table fashion, e.g. circular buffer, so that multiple sets of reset information can be tabulated. Each time a device resets, for whatever reason, a new set of reset information is added to the table in the non-volatile memory. It has been customary to capture the most recent reset information in attempts to determine the cause of the reset or other related problems. However, capturing information from each reset and making multiple sets of reset information available facilitates trending and other analysis of the reset data. In one exemplary embodiment, information related to the last 10 resets is maintained in the table. Of course, within the capability of the available memory, any number of resets could be stored and subsequently analyzed together or separately.

While the present invention is typically utilized with respect to telephony modems, it should be noted that the methods described herein could also apply to cable modems, for example.

In other embodiments of the present invention, the non-volatile memory could be a hard drive, an optical disc, or any other non-volatile memory capable of storing the reset information.

Figure 2:
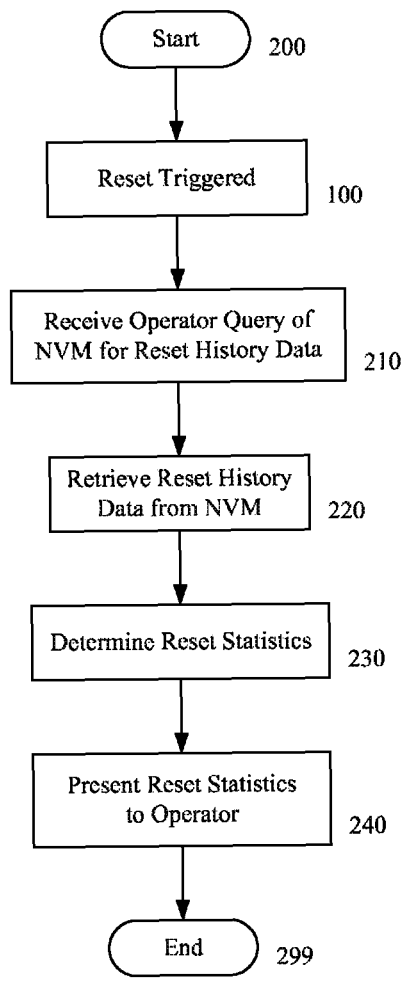
FIG. 2 is a flowchart illustrating a method for collecting the reset information from a network communication device as in FIG. 1 and presenting the reset statistics to an operator upon request.

FIG. 2 is a flowchart illustrating a method 200 for collecting the reset information as in FIG. 1 and presenting the reset statistics to an operator upon request. When the reset condition occurs at step 100, the information is retrieved as shown in FIG. 1.

Once the device is operational again, after the reset, an operator can request the reset history data by querying the non-volatile memory. The query is received by the network communication device at step 210. The device retrieves the reset history data from the non-volatile memory at step 220. The raw reset statistics are determined at step 230 and presented to the operator at step 240 in an appropriate format.

The reset information can be presented via SNMP MIBs, web interface, or command line interface, for example. Of course, the retrieved reset history information can be presented to any type analysis or management system capable of utilizing the data. Detailed analysis can be performed upon the raw reset history statistics for determination of reset conditions and causes to determine the nature of any device problems and possible solutions.

Typically, the reset history is retrieved from non-volatile memory and is formatted into data structures suitable for higher level management systems. One exemplary data structure is a standard SNMP MIB object to provide the system uptime since the last reset.

Historically, only the bare minimum of statistics have been available through SysUptime, a standard SNMP MIB object for network communication devices such as telephony modems. SysUptime merely provides the time that the device has been up (operational) since the last reset, and provides no information about the reason for the reset or any prior reset history. The reset history provided in the present invention provides more detailed historical reset information and allows for trending analysis of the resets, and facilitates determination as to whether there are hardware, software or operational issues with any recurring resets.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for collection of device reset history from a network communication device, the method comprising:
   a. determining that a software reset condition has been triggered;
   b. upon determination that the software reset condition is due to a software exception and prior to reset, retrieving reset information, wherein the reset information includes software exception information;
   c. upon determination that the software reset condition is due to a software initiation and prior to reset, retrieving reset information, wherein the reset information includes an identification of a software program responsible for the software reset;
   d. allocating space in a non-volatile memory of the network communication device; and
   e. storing current reset information into the non-volatile memory, wherein the current reset information includes the reset information that has been retrieved together with a corresponding reset time.

2. The method of claim 1, further comprising storing historical reset information and providing the historical information to a requesting device in response to an operator request.

3. The method of claim 1, further comprising presenting the reset information to a management system for analysis and tracking of reset information in determination of reset conditions and reset causes.

4. The method of claim 1, further comprising retrieving historical reset information and formatting the historical reset information into a data structure for subsequent retrieval by a high level management system.

5. The method of claim 1, further comprising storing specified parameters within the non-volatile memory, wherein each specified parameter provides information related to status of the network communication device.

6. A method for collection of device reset history from a network communication device, the method comprising:
   a. determining that a hardware reset has been triggered;
   b. proceeding with the hardware reset of the network communication device;
   c. executing startup code during reboot of the network communication device;
   d. retrieving reset information associated with the hardware reset, wherein the reset information includes hardware registry information and other residual hardware information that is still present after the hardware reset;
   e. storing current reset information into a non-volatile memory, wherein the current reset information includes the reset information that has been retrieved together with a current time; and
   f. adding the current reset information to historical reset information within the nonvolatile memory.

7. The method of claim 6, further comprising providing the historical reset information in response to an operator request.

8. The method of claim 6, further comprising presenting the reset information to a management system for analysis and tracking of reset information in determination of reset conditions and reset causes.

9. The method of claim 6, further comprising retrieving the historical reset information from the non-volatile memory and formatting the historical reset information into a data structure for subsequent retrieval by a high level management system.

10. The method of claim 6, wherein the network communication device is one of the following: a telephony modem, a cable modem.

11. The method of claim 6, wherein the non-volatile memory is one of the following: a flash memory, a hard drive, an optical disc.

12. The method of claim 6, wherein the non-volatile memory is structured as a circular buffer.

13. The method of claim 6, further comprising storing specified parameters within the non-volatile memory, wherein each specified parameter provides information related to status of the network communication device.

14. A method for collection of device reset history from a network communication device, the method comprising:
   a. upon determination that a reset condition has been triggered, determining whether the reset condition is triggered by software or hardware;
   b. if the reset condition is triggered by software:
      i. if the reset condition is due to a software exception, retrieving reset information, wherein the reset information includes software exception information;
      ii. if the reset condition is due to a software initiated reset, retrieving reset information, wherein the reset information includes an identification of a software program responsible for the reset condition;
      iii. storing current reset information into the non-volatile memory, wherein the current reset information includes the reset information that has been retrieved together with a corresponding reset time; and
iv. adding the current reset information to historical reset information within the non-volatile memory;
c. proceeding with a reset of the network communication device;
d. executing startup code during reboot of the network communication device;
e. if the reset condition was triggered by hardware:
  i. retrieving reset information that includes hardware registry information and other residual hardware information that is still present after the hardware reset;
  ii. storing the current reset information into the non-volatile memory, wherein the current reset information includes the reset information that has been retrieved together with a current time; and
  iii. adding the current reset information to historical reset information within the non-volatile memory; and f. continuing with normal operation of the network communication device.

15. The method of claim 14, the executing startup code further comprising:

retrieving hardware state information after the reset; and determining whether the reset was triggered by software or hardware.

16. The method of claim 15, wherein the hardware state information reflects the last known state of the hardware before reset.

17. The method of claim 15, wherein the hardware state information includes residual effects of the reset in the hardware.

18. The method of claim 15, further comprising retrieving the hardware state information from hardware registers that are not reset during a hardware reset.

* * * * *